(12) United States Patent
Zou et al.

(10) Patent No.: US 6,932,306 B2
(45) Date of Patent: Aug. 23, 2005

(54) RAPID-ACTUATED SUCTION CUP DEVICE

(76) Inventors: Den Jun Zou, Rm. C, 18th Floor, Building 29, 1st Village, Meilin, Futian Shenzehn (CN); Hung Wen Wu, 409 Deodar La., Bradbury, CA (US) 91010

( * ) Notice: Subject to any disclaimer, the term of this patent is extended or adjusted under 35 U.S.C. 154(b) by 47 days.

(21) Appl. No.: 10/686,905

(22) Filed: Oct. 15, 2003

(65) Prior Publication Data

US 2004/0079848 A1 Apr. 29, 2004

(30) Foreign Application Priority Data

Aug. 14, 2003 (CN) .......................................... 03140164 A

(51) Int. Cl.⁷ .............................................. A45D 42/14
(52) U.S. Cl. ............................... 248/205.5; 248/206.2; 248/363
(58) Field of Search .......................... 248/205.5, 205.6, 248/205.7, 205.8, 205.9, 206.1, 206.2, 363

(56) References Cited

U.S. PATENT DOCUMENTS

| | | | |
|---|---|---|---|
| 355,021 A | 12/1886 | Lang ........................ | 248/205.8 |
| 1,119,111 A | 12/1914 | Pellow et al. ............... | 248/363 |
| 2,657,893 A | 11/1953 | Puckert ....................... | 248/206 |
| 3,240,461 A | 3/1966 | Singleton .................... | 248/206 |
| 3,747,170 A | 7/1973 | Kieves ......................... | 24/263 |
| 3,750,991 A | 8/1973 | Ragir ........................ | 248/206 R |
| 4,012,007 A | 3/1977 | Cunningham ............ | 242/55.54 |
| 4,133,575 A | 1/1979 | Mäder ...................... | 296/95 R |
| 4,580,751 A | 4/1986 | Panzer ................... | 248/205.8 |
| 5,031,865 A | 7/1991 | Blattner ...................... | 248/122 |
| 5,087,005 A | 2/1992 | Holoff et al. ............ | 248/205.8 |
| 5,104,077 A | 4/1992 | Liu .......................... | 248/205.8 |
| 5,176,346 A | 1/1993 | Liu .......................... | 248/206.1 |
| 5,263,593 A | 11/1993 | Aida .......................... | 211/69.1 |
| 5,366,129 A | 11/1994 | Nakamura et al. ............ | 225/42 |
| 5,820,116 A * | 10/1998 | Haese .......................... | 269/21 |
| 5,970,860 A | 10/1999 | Yip ............................... | 99/510 |
| 6,308,923 B1 | 10/2001 | Howard .................... | 248/205.5 |
| 6,386,494 B1 | 5/2002 | Huang ...................... | 248/205.8 |
| 6,402,104 B1 | 6/2002 | Smith ....................... | 248/205.5 |
| 6,663,077 B2 * | 12/2003 | Zou ........................... | 248/683 |
| 2002/0113181 A1 | 8/2002 | Zou ......................... | 248/205.5 |
| 2002/0190170 A1 | 12/2002 | Ting ........................ | 248/205.5 |

FOREIGN PATENT DOCUMENTS

| | | | | |
|---|---|---|---|---|
| CN | 03140164.3 | 8/2003 | | |
| DE | 2044859 | 9/1970 | | |
| EP | 0 915 263 | 5/1999 | | |
| GB | 2 185 067 | 7/1987 | | |
| GB | 2 275 723 | 9/1994 | | |
| JP | 5-220042 | * 8/1993 | ............. | 248/205.2 |
| JP | 2001220783 | 8/2001 | | |
| JP | 02001227525 | 8/2001 | | |
| WO | WO 03/040577 | 5/2003 | | |

* cited by examiner

Primary Examiner—Ramon O Ramirez
(74) Attorney, Agent, or Firm—Marc Karish Sheldon & Mak

(57) ABSTRACT

A suction device having a suction cup; a pulling bar, the pulling bar having a first end coupled to the suction cup and an opposed second end; a cover having a spiral guiding ring, the spiral guiding ring having a flange on an inner surface; a spiral guiding cap having a rib, the spiral guiding cap being rotatably coupled to the spiral guiding ring so that the flange moves along the rib when the spiral guiding cap is rotated and a locking cap coupled to the second end of the pulling bar, the locking cap having a head positionable against the spiral guiding cap; wherein the spiral guiding cap is turned less than 360 degrees to reach a fully engaged condition.

16 Claims, 3 Drawing Sheets

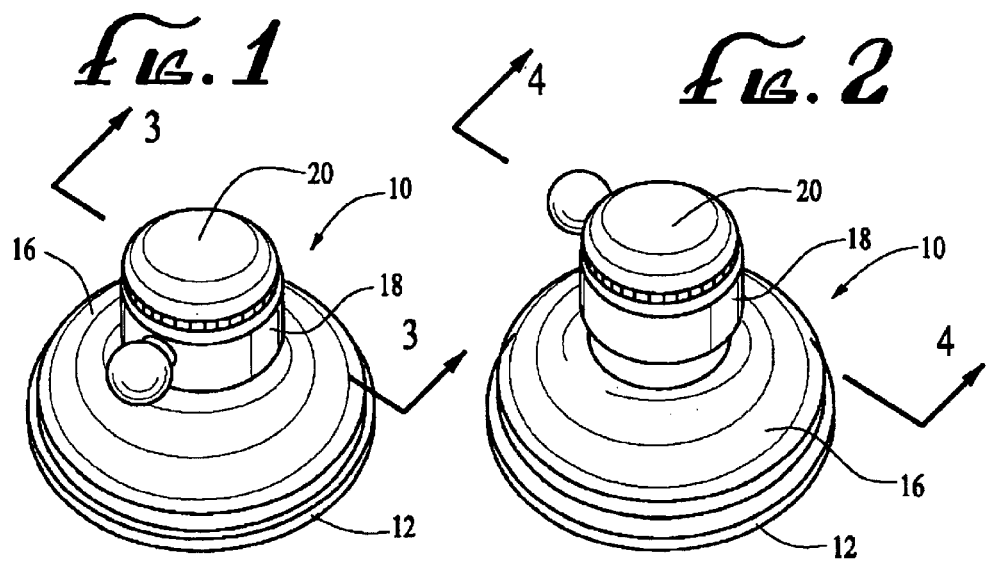
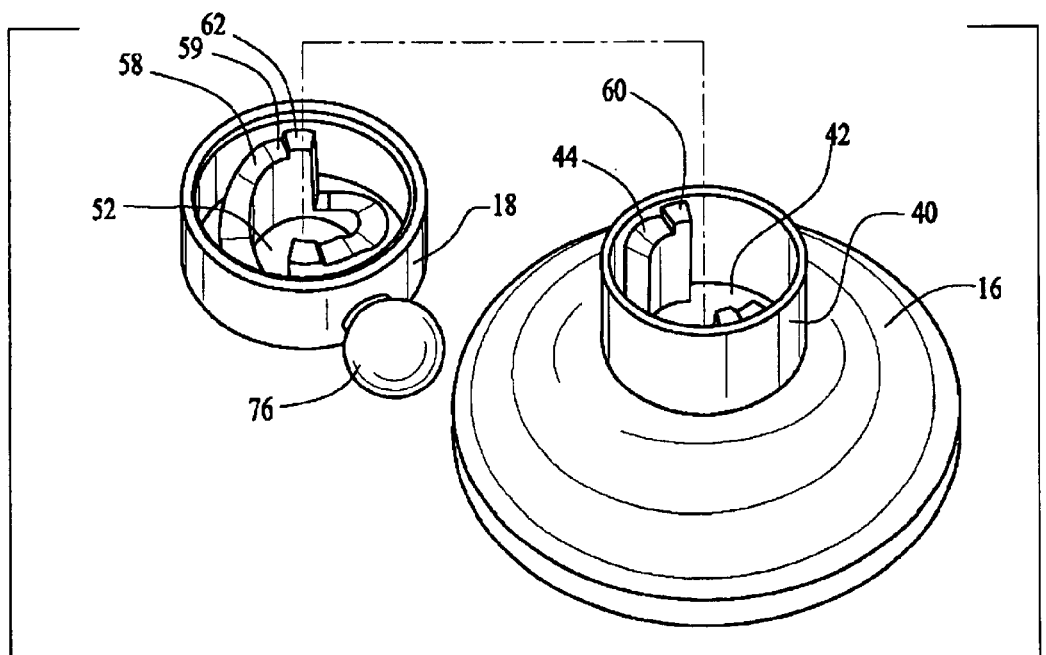

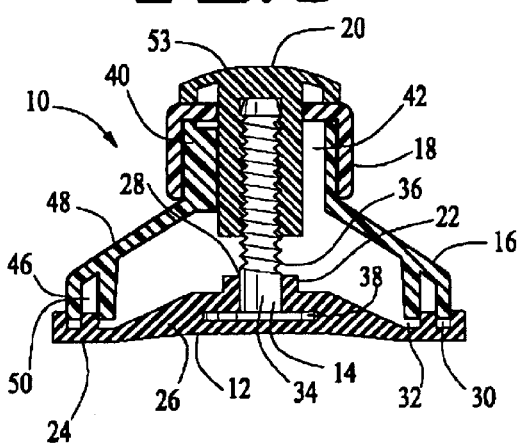
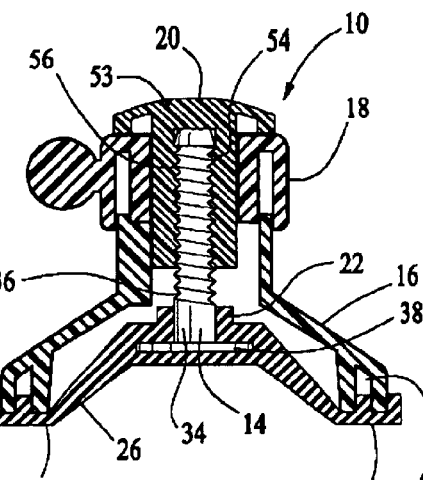
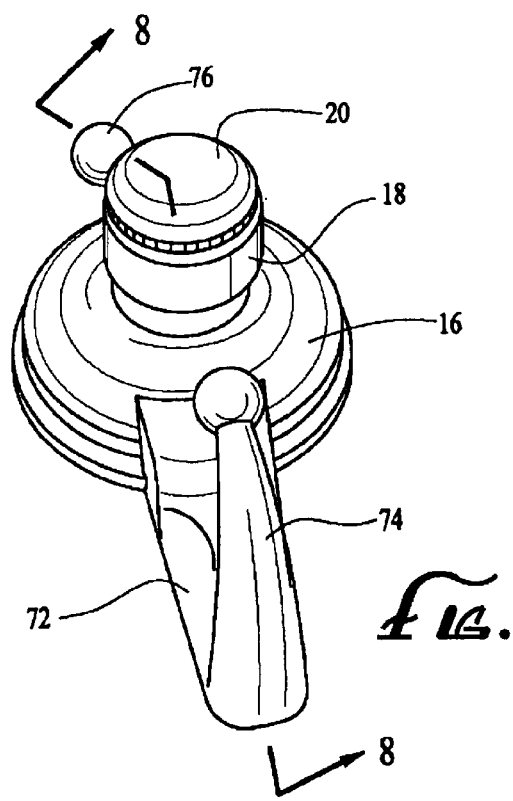
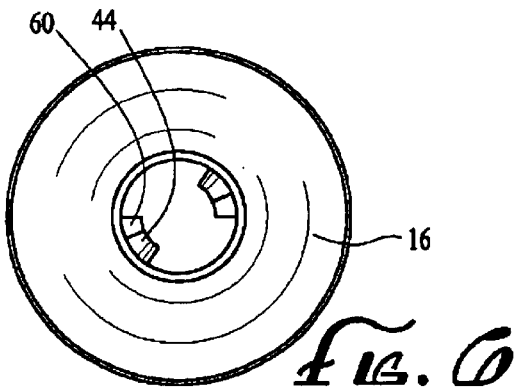

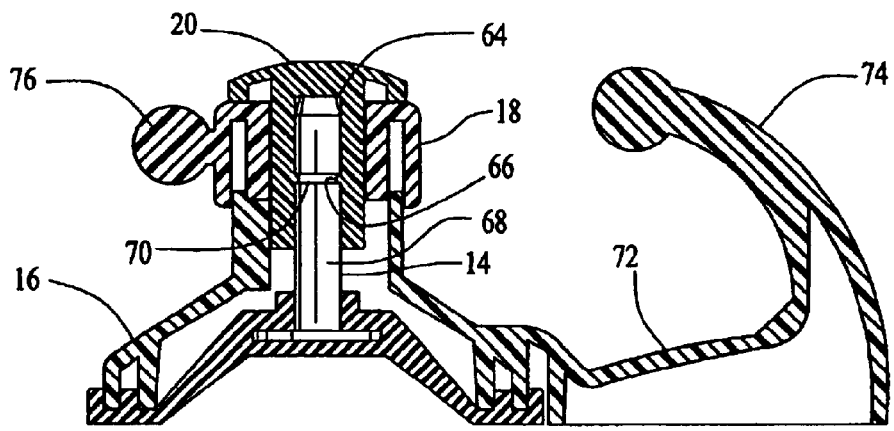
*fig.8*
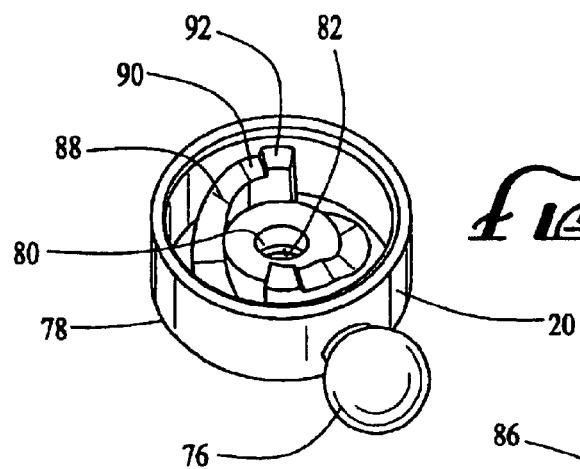
*fig.11*
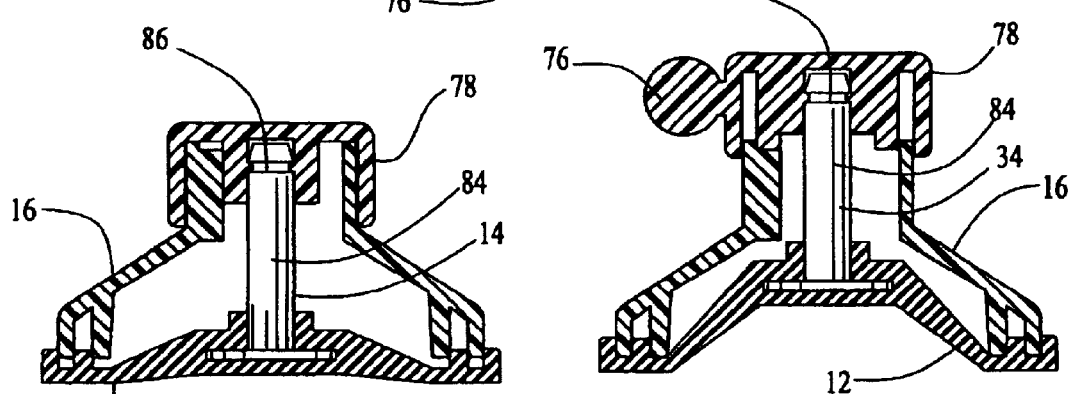
*fig.9*
*fig.10*

RAPID-ACTUATED SUCTION CUP DEVICE

CROSS REFERENCE TO RELATED APPLICATIONS

The present application claims priority of Chinese Patent Application No. 03140164.3, filed on Aug. 14, 2003.

BACKGROUND

The present invention is directed to suction devices. Exemplary suction devices can be found in U.S. Pat. Nos. 355,021; 1,119,111; 2,657,893; 3,240,461; 3,747,170; 3,750,991; 4,012,007; 4,133,575; 4,580,751; 5,031,865; 5,087,005; 5,104,077; 5,176,346; 5,263,593; 5,366,129; 5,970,860; 6,308,923; 6,386,494; 6,402,104, U.S. Patent Publication No. 2002/0190170; UK Patent Application No. GB 2275723A.

There is a need for a suction device that improves over the prior art suction devices.

SUMMARY OF THE INVENTION

The present invention is directed to a suction device. In an embodiment of the present invention the suction device comprises a suction cup and a pulling bar. The pulling bar further comprises a first end coupled to the suction cup and an opposed second end. The suction device also comprises a cover having a spiral guiding ring, and a spiral guiding cap. The spiral guiding ring has a flange and the spiral guiding cap has a rib. The spiral guiding cap is rotatably coupled to the spiral guiding ring so that the flange moves along the rib when the spiral guiding cap is rotated. A locking cap is coupled to the second end of the pulling bar, the locking cap having a head positionable against the spiral guiding cap. The spiral guiding cap is turned less than 360 degrees to reach a fully engaged condition.

Optionally, the spiral guiding cap further comprises a detent. Upon rotation of the spiral guiding cap, the detent engages the flange to hold the spiral guiding cap in place. Optionally, the spiral guiding ring further comprises a step; and the spiral guiding cap further comprises a tab. The step engages the tab to prevent rotation of the spiral guiding cap beyond the fully engaged condition.

Optionally, the pulling bar further comprises a male thread; and the locking cap further comprises a female thread engageable with the male thread of the pulling bar. Optionally, the pulling bar further comprises a boss; and the locking cap further comprises a detent engageable with the boss of the pulling bar.

A connecting member can be coupled to the cover for hanging an article. Additionally, the connecting member can have a hook. Optionally, the spiral guiding cap can have a lever to help turn the spiral guiding cap.

The present invention is also directed to a method of attaching an object to a flat surface, the method having the following steps: obtaining an apparatus according to the present invention, placing the apparatus against the flat surface; and rotating the spiral guiding cap less than 360 degrees to adhere the apparatus to the flat surface.

In an additional embodiment, the present invention is directed to a suction device comprising: a suction cup; a pulling bar, the pulling bar comprising a first end coupled to the suction cup; and an opposed second end; a cover having a spiral guiding ring with a flange on an inner surface; and a spiral guiding and locking cap having a rib and a detent. The spiral guiding and locking cap is rotatably coupled to the spiral guiding ring so that the flange rides along the rib when the spiral guiding and locking cap is rotated until the flange engages the detent. The spiral guiding and locking cap is rotatably coupled to the second end of the pulling bar. The spiral guiding cap is turned less than 360 degrees to reach a fully engaged condition.

BRIEF DESCRIPTION OF THE DRAWINGS

The features, aspects and advantages of the present invention will become better understood with regard to the following description, appended claims and accompanying figures where:

FIG. 1 is a top perspective view of a suction device according to a first embodiment of the present invention shown in an unlocked position;

FIG. 2 is a top perspective view of the suction device of FIG. 1 shown in an engaged position;

FIG. 3 is a cross sectional view taken along line 3—3 of FIG. 1;

FIG. 4 is a cross sectional view taken along line 4—4 of FIG. 2;

FIG. 5 is an exploded perspective view of the cover and the spiral guiding cap of FIG. 1;

FIG. 6 is a top view of the cover of FIG. 1;

FIG. 7 is a top perspective view of a suction device according to a second embodiment of the present invention having a connecting member;

FIG. 8 is a cross sectional view taken along line 8—8 of FIG. 7;

FIG. 9 is a cross sectional view of a suction device according to a third embodiment of the present invention in an unlocked position taken along a longitudinal axis through the center;

FIG. 10 is a cross sectional view of the suction device of FIG. 9 in an engaged position; and FIG. 11 is a bottom perspective view of the guiding and locking cap of FIG. 9.

DETAILED DESCRIPTION

As shown in FIGS. 1 to 6, a suction device 10 according to a first embodiment of the present invention generally has a suction cup 12, a puller bar 14, a cover 16, a spiral guiding cap 18 and a locking cap 20.

The suction cup 12 is generally made from flexible materials such as rubber and soft plastics. As shown in FIGS. 3 and 4, the suction cup 12 is in the shape of a tapered umbrella and comprises a base portion 22, a rim portion 24 and a declining intermediate portion 26. The base portion 22 comprises a central blind hole 28 having an inverted T-shaped cross-section. The rim portion 24 has an annular U-shaped channel 30 and an annular recess 32 inward and adjacent to the U-shaped channel 30. The declining intermediate portion 26 between the base portion 22 and the rim portion 24 can have a tapered cross section.

The puller bar comprises a body 34 with a male thread 36 thereon and a flange 38 at a first end. The flange 38 is engaged with the base portion 22 of the suction cup 12 to position the puller bar body 34 along a longitudinal axis perpendicular to the surface to which the suction cup is to be attached. As shown in FIGS. 3 and 4, the puller bar has a T-shaped cross section.

The cover 16 is in general made from rigid materials such as hard plastics, metal and wood. The shape of the cover 16 corresponds to the shape of the suction cup 12. As shown in FIGS. 5 and 6, the cover 16 has a spiral guiding ring 40 with a central through hole 42 to allow the puller bar body 34 to pass through. The spiral guiding ring 40 contains at least one flange 44.

As shown in FIG. 3, The cover 16 also has an edge portion 46 and a declining intermediate portion 48 between the spiral guiding ring 40 and the edge portion 46. The edge portion 46 of the cover 16 has an annular U-shaped projection 50 engageable with the annular U-shaped channel 30 and the annular recess 32 of the suction cup 12.

The spiral guiding cap 18 is rotatably supported on the spiral guiding ring 40. The spiral guiding cap 18 has a through hole 52 to allow the puller bar body 34 to pass through. Once the spiral guiding cap 18 is positioned on the spiral guiding ring 40, the puller bar body 34 is extended through the spiral guiding ring through hole 42 and the spiral guiding cap through hole 52. The locking cap 20 is then coupled to the puller bar body 34.

The locking cap 20 has a head 53 positionable against the spiral guiding cap 18. In the first embodiment of the present invention, as shown in FIGS. 3 and 4, the locking cap 20 also has a central hole 54 with a female thread 56 therein. The female thread 56 of the locking cap 20 engages the male thread 36 of the puller bar body 34. One skilled in the art will recognize that the threading may be reversed with the puller bar having the female thread and the locking cap having the male thread.

As shown in FIGS. 3 to 5, the spiral guiding cap has at least one rib 58 positionable on the at least one flange 44 of the spiral guiding ring 40. The rib 58 has a spiral shaped surface. As the spiral guiding cap 18 is rotated, the rib 58 engages with the flange 44 to move the spiral guiding cap along the longitudinal axis. The spiral guiding ring 40 can have a plurality of flanges and the spiral guiding cap can have a plurality of ribs, with each rib rotating against a different flange.

In operation, the suction cup 12 is placed against a smooth mounting surface and the spiral guiding cap 18 is rotated, thereby moving the spiral guiding cap along the longitudinal axis. As the spiral guiding cap 18 is moved along the longitudinal axis, the locking cap 20 which is positioned against the spiral guiding cap 18 is also moved along the longitudinal axis. The locking cap 20 in turn pulls the puller bar 14 which pulls the base portion 22 of the suction cup 12. An arch-shaped vacuum space is thereby created between the smooth surface and the suction cup 12. The engagement between the U-shaped channel 30 and the annular recess 32 of the suction cup 12 and the U-shaped projection 50 of the cover 16 prevents air from entering into the vacuum space causing the suction cup 12 to tightly adhere to the smooth mounting surface.

The spiral guiding cap 18 has a detent 59 at an end of the rib 58. Once the spiral guiding cap 18 is rotated beyond a preselected point, the detent 59 engages the flange 44 to stop rotation of the spiral guiding cap and hold the spiral guiding cap in a fully engaged condition.

In a fully engaged condition, the suction cup and the attached puller bar 14 are pulled toward the mounting surface, thereby holding the spiral guiding cap detent 59 in contact with spiral guiding ring flange 44 until a significant rotation force is exerted on the spiral guiding cap 18. The detent 59 in conjunction with the flange 44 keeps the suction device in the fully engaged condition for an extended period of time, absent intentional disengagement by a user.

Additionally, the spiral guiding ring 40 can have a step 60 at an end of the flange 44 and the spiral guiding cap 18 can have a tab 62 at an end of the rib 58. Upon rotation of the spiral guiding cap 18 to the fully engaged condition, the tab 62 engages the step 60 to prevent continued rotation of the spiral guiding cap 18. The step 60 and the tab 62 can be otherwise located as long as the step 60 and the tab 62 contact each at a preselected point to prevent continued rotation.

Preferably, the locking cap 20 is turned less than about 360 degrees to reach a fully engaged condition. More preferably the locking cap 20 is turned less than about 180 degrees to reach the fully engaged condition. Still more preferably, the locking cap 20 is turned less than about 90 degrees to reach the fully engaged condition.

In a second embodiment of the present invention, shown in FIGS. 7 and 8, the locking cap 20 has a central hole 64 with a boss 66 therein. In the second embodiment, the puller bar body 34 is formed as a post 68 having a detent 70 thereon. Upon insertion of the puller bar body 34 into central hole 64, the boss 66 engages with the detent 70 to prevent the puller bar 14 from being detached from the locking cap 20. One skilled in the art will recognize that the boss and detent arrangement may be reversed with the locking cap having the detent and the puller bar having the boss.

As shown in FIGS. 7 and 8, the suction device according to the present invention may further include a connecting member 72 connected to the cover 16. The connecting member 72 can be used to couple an article, such as a picture frame, towel rack, or the like, to the suction device 10. The connecting member 72 may include a hook 74 for hanging articles on the suction device. Those skilled in the art will recognize that the connecting member 72 may be varied depending on particular applications. For example, the connecting member 72 may comprise a hole for inserting a bar assembled with a plurality of hooks. Additionally, the spiral guiding cap 18 may have a lever 76 coupled to an outer surface for assisting a user in gripping and turning the spiral guiding cap 18.

In a third embodiment, as shown in FIGS. 9 to 11, a spiral guiding and locking cap 78 is locked directly to the puller bar body 34. Thus, in the third embodiment, the spiral guiding and locking cap 78 has a central hole 80 with a boss 82 therein. The puller bar body 34 is formed as a post 84 having a detent 86 thereon. Upon insertion of the puller bar body 34 into the central hole 80 of the spiral guiding and locking cap 78, the boss 82 engages with the detent 86 to prevent the puller bar 14 from being detached from the spiral guiding and locking cap 78. The boss 82 and the detent 86 are engaged so as to allow rotation of the spiral guiding and locking cap 78 around the puller bar 14. One skilled in the art will recognize that the boss and detent arrangement may be reversed with the locking cap having a detent and the puller bar having a boss.

Additionally, as shown in FIG. 11, the spiral guiding and locking cap 78 is rotatably mounted on the spiral guiding ring 40. The spiral guiding and locking cap 78 has at least one rib 88 positionable on the at least one flange 44 of the spiral guiding ring 40. The spiral guiding and locking cap also has a detent 90 that engages the flange 44 of the spiral guiding ring 40 when the spiral guiding and locking cap 78 is rotated into the fully engaged condition. Additionally, the spiral guiding and locking cap can have a tab 92 that engages with the step 60 of the spiral guiding ring 40 to prevent rotation of the spiral guiding and locking ring beyond the fully engaged condition.

With the sucker structure of the present invention, the sucker body may firmly be adhered to the smooth surface for a long time without detachment.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstracts and drawings, and all the steps in any method or process disclosed, may be combined in any combination except combination where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" or "step" clause as specified in 35 U.S.C. §112.

What is claimed is:

1. A suction device comprising:
   a) a suction cup;
   b) a pulling bar, the pulling bar comprising:
      a first end coupled to the suction cup; and
      an opposed second end;
   c) a cover having a spiral guiding ring with a flange; and
   d) a spiral guiding and locking cap having a rib and a detent;
   wherein the spiral guiding and locking cap is rotatably coupled to the spiral-guiding ring so that the rib rides along the flange when rotated until the flange engages the detent;
   wherein the spiral guiding and locking cap is rotatably coupled to the second end of the pulling bar; and
   wherein the spiral guiding and locking cap is turned less than 360 degrees to reach a fully engaged condition.

2. The apparatus of claim 1 wherein:
   the spiral guiding ring further comprises a step;
   the spiral guiding and locking cap further comprises a tab; and
   wherein the step engages the tab to prevent rotation of the spiral guiding and locking cap beyond the fully engaged condition.

3. The apparatus of claim 1 wherein the spiral guiding and locking ring further comprises:
   an exterior surface; and
   a lever coupled to the exterior surface.

4. A suction device comprising:
   a) a suction cup;
   b) a pulling bar, the pulling bar comprising:
      a first end coupled to the suction cup;
      a male thread; and
      an opposed second end;
   c) a cover having a spiral guiding ring, the spiral guiding ring having a flange;
   d) a spiral guiding cap having a rib, the spiral guiding cap being rotatably coupled to the spiral-guiding ring so that the flange moves along the rib when the spiral guiding cap is rotated; and
   e) a locking cap coupled to the second end of the pulling bar, the locking cap having a head positionable against the spiral guiding cap and a female thread engageable with the male thread of the pulling bar; and
   wherein the spiral guiding cap is turned less than 360 degrees to reach a fully engaged condition.

5. The apparatus of claim 4 wherein:
   the spiral guiding cap further comprises a detent; and
   upon rotation of the spiral guiding cap, the detent engages the flange to hold the spiral guiding cap in place.

6. The apparatus of claim 4 wherein the spiral guiding cap is turned less than 90 degrees to reach the fully engaged condition.

7. The apparatus of claim 4 wherein the spiral guiding cap further comprises a lever.

8. A suction device comprising:
   a) a suction cup;
   b) a pulling bar, the pulling bar comprising:
      a first end coupled to the suction cup;
      a female thread; and
      an opposed second end;
   c) a cover having a spiral guiding ring, the spiral guiding ring having a flange;
   d) a spiral guiding cap having a rib, the spiral guiding cap being rotatably coupled to the spiral-guiding ring so that the flange moves along the rib when the spiral guiding cap is rotated; and
   e) a locking cap coupled to the second end of the pulling bar, the locking cap having a head positionable against the spiral guiding cap and a male thread engageable with the female thread of the pulling bar; and
   wherein the spiral guiding cap is turned less than 360 degrees to reach a fully engaged condition.

9. The apparatus of claim 8 wherein:
   the spiral guiding cap further comprises a detent; and
   upon rotation of the spiral guiding cap, the detent engages the flange to hold the spiral guiding cap in place.

10. The apparatus of claim 8 wherein the spiral guiding cap is turned less than 90 degrees to reach the fully engaged condition.

11. The apparatus of claim 8 wherein the spiral guiding cap further comprises a lever.

12. A suction device comprising:
    a) a suction cup;
    b) a pulling bar, the pulling bar comprising:
       a first end coupled to the suction cup;
       a boss; and
       an opposed second end;
    c) a cover having a spiral guiding ring, the spiral guiding ring having a flange;
    d) a spiral guiding cap having a rib, the spiral guiding cap being rotatably coupled to the spiral-guiding ring so that the flange moves along the rib when the spiral guiding cap is rotated; and
    e) a locking cap coupled to the second end of the pulling bar, the locking cap having a head positionable against the spiral guiding cap and a detent engageable with the boss of the pulling bar; and
    wherein the spiral guiding cap is turned less than 360 degrees to reach a fully engaged condition.

13. The apparatus of claim 12 wherein:
    the spiral guiding cap further comprises a detent; and
    upon rotation of the spiral guiding cap, the detent engages the flange to hold the spiral guiding cap in place.

14. The apparatus of claim 12 wherein the spiral guiding cap is turned less than 90 degrees to reach the fully engaged condition.

15. The apparatus of claim 12 wherein the spiral guiding cap further comprises a lever.

16. A method of attaching an object to a flat surface, the method comprising:
    obtaining an apparatus according to claim 12;
    placing the apparatus against the flat surface; and
    rotating the spiral guiding cap less than 360 degrees to stick the apparatus to the flat surface.

* * * * *